(No Model.)
G. A. WASHBURN.
REGULATING ELECTRIC MOTORS.
No. 422,862. Patented Mar. 4, 1890.
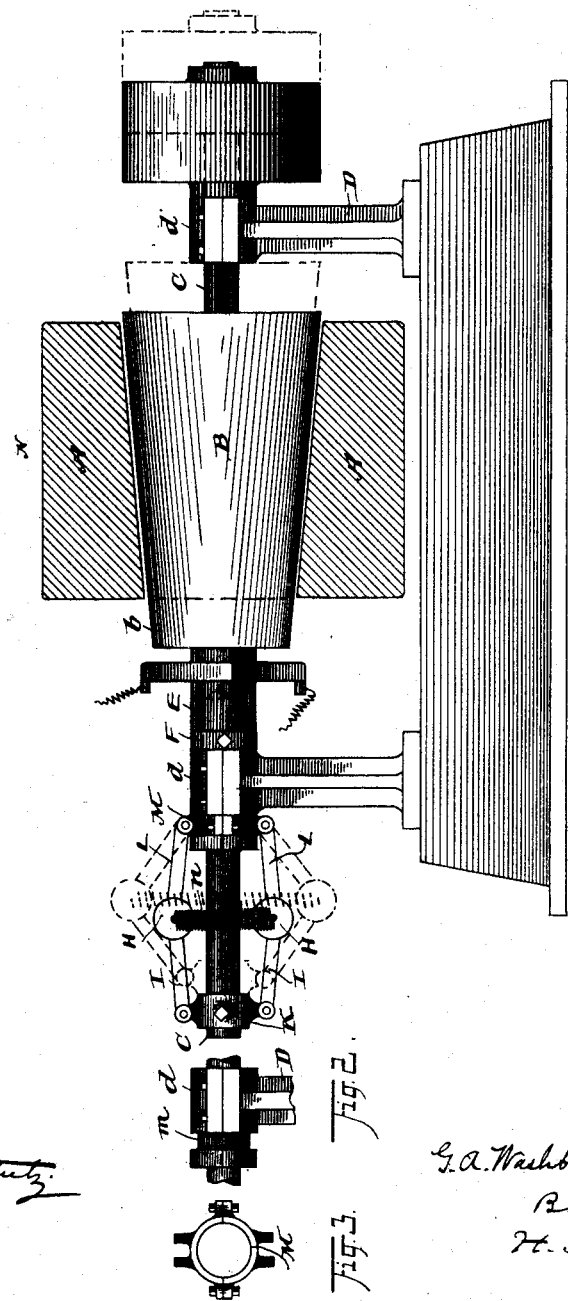

UNITED STATES PATENT OFFICE.

GEORGE A. WASHBURN, OF CLEVELAND, OHIO, ASSIGNOR TO FORD & WASHBURN, OF SAME PLACE.

REGULATING ELECTRIC MOTORS.

SPECIFICATION forming part of Letters Patent No. 422,862, dated March 4, 1890.

Application filed July 11, 1889. Serial No. 317,233. (No model.)

*To all whom it may concern:*

Be it known that I, GEORGE A. WASHBURN, a citizen of the United States, residing at Cleveland, in the county of Cuyahoga and State of Ohio, have invented certain new and useful Improvements in Electric Motors; and I do hereby declare that the following is a full, clear, and exact description of the invention, which will enable others skilled in the art to which it appertains to make and use the same.

My invention relates to improvements in electric motors; and the object of the invention is to provide a motor in which the speed of the armature is automatically maintained under a constant current and a varying load.

To this end the invention consists in a motor having a conical or conoidal-shaped armature and a suitably-shaped field, with a governor for the armature constructed and arranged to automatically move the armature farther from or nearer to the field, according as the load or pull is lighter or heavier. It is ascertained that the power of the field over the armature is decreased as the square of the distance between said parts—that is, if the distance or space be, say, one-sixteenth of an inch and the armature be moved another sixteenth away, so as to make two-sixteenths, the magnetic influence would be diminished four times, or be four times less than if the parts were working nearly face to face, as in their best working relation; hence it follows that the speed of the motor may be regulated by changing the position of the armature with respect to the field regardless of the current that is passing through the field, and this regulation or control may extend from the maximum magnetic power, as when the armature is in its closest working relation to the field, down to the minimum of such power, as when the armature is practically removed from the influence of the field, by throwing a sufficient space between said parts to produce such a result. I have therefore devised an armature that is of a conical or conoidal shape, set in a field of like shape interiorly and provided with a governor for the armature, which will automatically withdraw the armature from proximity to the field according as the load is diminished. A conical form of armature is especially adapted to this method of controlling speed, as the armature can be withdrawn from field attraction by the least possible axial movement. Obviously, if the sides of the armature were parallel instead of converging, no difference could be made in the space between it and the field by any longitudinal movement thereof except the entire withdrawal of the armature, and this, in a drum-armature especially, would mean such distance of movement as to render it impracticable. The same objection would apply in a ring-armature, though possibly in a less degree; but by employing the conical shape the slightest longitudinal movement of the armature will tell on the difference in space between it and the field, and consequently on the magnetic influence of the field. Thus it occurs that a governor with this form of motor is especially efficient and effective in controlling the speed, while in a different form of motor it might be only partially effective or be wholly insufficient in producing the desired result.

I am aware that various expedients have been resorted to to automatically control the speed of motors and to maintain uniformity therein, such as varying the field-magnetism by passing the current through one or more coils according to the load, varying the entire volume of the current passing through the field, shifting the commutator-brushes, and the like. I am also aware of a governor employed in connection with a ring-armature and a "dummy-armature" on the same shaft, said parts adapted to be moved longitudinally to carry the armature proper out of the magnetic field. This construction, however, is liable to the objection that as long as any part of the armature remains within the field it is under the same magnetic power as when the whole armature is within the field, so that the armature must be moved wholly to one side of the field before it is cleared, and this change cannot be made with governors without considerable racing of the motor before the governor can respond and carry the armature out. The difficulty in such cases is the long distance the armature has to move before it is relieved of the force of the current and the magnetic attraction of the field for the motor, making it difficult to withdraw the armature at all. The dummy-armature is designed to counterbalance this tendency.

The object of my invention, therefore, is to utilize the governor with that form of armature which can most quickly and certainly be removed from the influence of the field, so that a constant current may be maintained and the amount of work done be the determining quantity as to the amount of current used.

In the accompanying drawings, Figure 1 is a longitudinal sectional elevation of an electric motor in which my principle of construction and combination of parts are employed. Figs. 2 and 3 are details of parts, as will be more fully specified in the description.

A represents the field, (shown in section and having the respective pole-pieces marked N and S.)

B is the armature, and C the armature-shaft. The armature is made in the form of a frustum of a cone, or conoidal, having its sides converging uniformly from end to end, and extending slightly beyond the field at its smaller end, as seen at $b$, so that when it has been moved longitudinally, by means of the governor, a sufficient distance to practically carry the armature out of magnetic influence of the field, by reason of its separation therefrom and the space between said parts, the entire length of the field will still be occupied by the armature. In this way I wholly avoid the eddying of the current within the field, which would occur if the armature and field were made of equal length. It also follows as a consequence of the shape of the armature and field that when the armature is taken out of the attractive power of the field the lines of force are broken largely from or toward the center, instead of being broken by a longitudinal pull on the armature. The armature, of course, does move longitudinally, but only a comparatively short distance and with the full length of the field still occupied by it, so that there is no pull endwise but a snapping or breaking of the lines of force as the space between the sides of the respective parts increases, which occurs transversely to the axis of the armature.

D represents the posts with bearings $d$ $d'$ for the armature-shaft. These bearings, it will be seen, by reason of the slight longitudinal movement of the shaft, may be placed very near the field, so that as firm a support for the shaft B and armature is obtained as can be desired. Upon the right of Fig. 1 the bearing $d'$ is shown as arranged just far enough from the field to allow the armature to have the necessary endwise movement.

E is the commutator, and between the commutator and the bearing $d$ is a collar F, provided with a set-screw to tighten the collar on the shaft C. The purpose of said collar is to set the armature in its proper working position with respect to the field and limit its movement toward the governor beyond the desired point, so that there will be no binding or wear between the armature and field.

The governor consists of two balls H H, connected each by a link I with a collar K, (seen in end view in Fig. 3,) and fastened by a set-screw on the axle C at the extremity of said axle outside the bearing $d$, and two other links L connect said balls respectively with a collar M on the neck $m$ of the bearing $d$. (Seen in detail in Fig. 2.) A spring $n$ connects the balls H H, and this completes the governor. Obviously, if the governor be set for a certain speed and at that speed maintains the armature in its proper working relation to the field, a greater rate of speed would at once increase the centrifugal tendency of the balls H and give more or less endwise thrust to the shaft C, which would to that extent remove the armature from the field and diminish the field influence, as hereinbefore described.

Having thus described my invention, what I claim as new, and desire to secure by Letters Patent, is—

1. In an electric motor, a field-magnet constructed to operate with an armature having the form of a frustum of a cone and an armature movable longitudinally in the field, in combination with a governor controlling the position of the armature, and an adjustable stop to limit the longitudinal movement of the armature, substantially as set forth.

2. In an electric motor, a field-magnet and an armature of conical shape movable longitudinally in the field, in combination with a shaft on which the armature is secured, bearings, as D, for the shaft, a governor directly upon the shaft outside of the said bearings, and stop, as F, to limit the movement of the armature into the field, substantially as set forth.

GEORGE A. WASHBURN.

Witnesses:
I. L. COREY,
H. T. FISHER.